Figure 3:
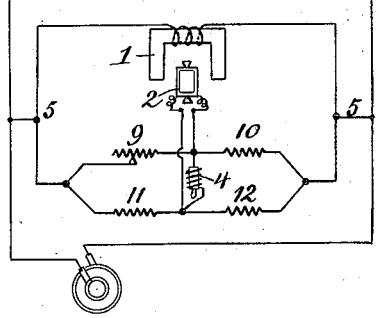

H. ABRAHAM.
APPARATUS FOR PRODUCING DIRECTIVE FORCES BY INDUCTION IN ALTERNATING CURRENT CIRCUITS.
APPLICATION FILED FEB. 24, 1912.
1,157,281.
Patented Oct. 19, 1915.
2 SHEETS—SHEET 1.
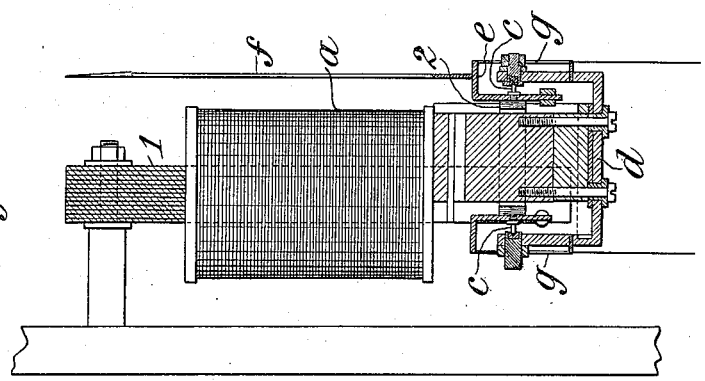
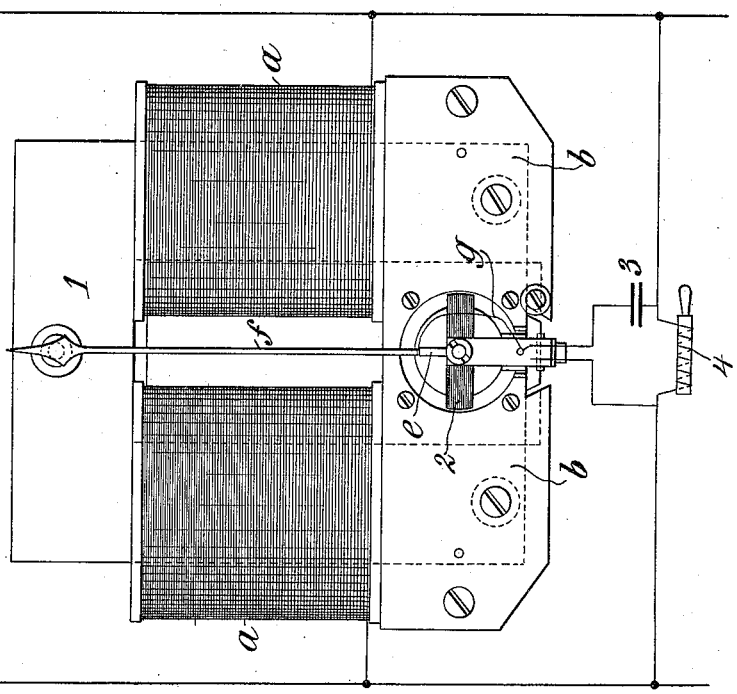
WITNESSES:
INVENTOR:
Henri Abraham,
By Attorneys, H. ABRAHAM.
APPARATUS FOR PRODUCING DIRECTIVE FORCES BY INDUCTION IN ALTERNATING CURRENT CIRCUITS.
APPLICATION FILED FEB. 24, 1912.

1,157,281.

Patented Oct. 19, 1915.
2 SHEETS—SHEET 2.

WITNESSES
Fred White
René Bruine

INVENTOR:
Henri Abraham,
By Attorneys,

UNITED STATES PATENT OFFICE.

HENRI ABRAHAM, OF PARIS, FRANCE, ASSIGNOR TO HENRI ABRAHAM ET JULES CARPENTIER, OF PARIS, FRANCE.

APPARATUS FOR PRODUCING DIRECTIVE FORCES BY INDUCTION IN ALTERNATING-CURRENT CIRCUITS.

1,157,281.  Specification of Letters Patent.  Patented Oct. 19, 1915.

Application filed February 24, 1912. Serial No. 679,654.

*To all whom it may concern:*

Be it known that I, HENRI ABRAHAM, a citizen of the Republic of France, residing in Paris, France, have invented certain new and useful Improvements in Apparatus for Producing Directive Forces by Induction in Alternating-Current Circuits, of which the following is a specification.

The present invention relates to improvements in electrical apparatus, and aims to provide improvements therein.

In the present invention directive forces are produced, by means of induction, in an alternating current apparatus comprising an electromagnet and a coil movable in the field of the electromagnet, both the electromagnet and coil being supplied with alternating current.

The directive forces may be utilized in various ways, as for the measurement of resistance, for the measurement of frequency, etc.

Figures 1 and 2 show an elevation and a vertical section of the apparatus embodying the invention. Figs. 3 to 6 inclusive illustrate examples of the application of the present invention to the measurement of various electrical constants.

The same reference numerals are used for similar parts in all the figures.

Referring to Figs. 1 and 2, the apparatus comprises an inductor 1 constituted by superposed rectangular shaped pieces of iron. These iron pieces terminate in two pole pieces *b* and carry the exciting coils *a*, fed by alternating current and between which is a movable coil 2 mounted on two pivots *c* upon a bracket *d*, upon which bracket is fixed a circular core which leaves between its surface and those of the cylindrically recessed pole pieces, an annular air space in which the coil 2 can be moved. The latter bears, through the intermediary of an arm *e*, an indicating hand *f*. An alternating current of the same frequency as the current which traverses the coils *a* is introduced into the movable coil 2 by means of sheets of foil *g*. As shown in these figures, the movable coil 2 is acted upon inductively by the alternating field of the electromagnet 1. The coil is included in a circuit containing a capacity 3 and a self induction 4. If the reactance due to the capacity 3 was greater than the reactance due to the inductance 4, the induced current would lead the electro-motive force and the directive force would be negative; it would then be able to counteract the directive force of an elastic spring. If on the other hand the reactance due to the inductance was greater than that due to the capacity, the current would lag behind the electro-motive force; the directive force would be positive and would act with or completely replace such a spring.

In Fig. 3 there is shown a diagram of connections for the case in which the apparatus is to serve as an ohm meter. To the binding posts 5 are attached the conductors of the circuit feeding the electro-magnet 1. In the field of the magnet is located the movable coil 2, the two ends of which are attached to the two branches of a Wheatstone bridge connected through an induction coil 4. The four resistances of the Wheatstone bridge are designated by the numbers 9, 10, 11 and 12. If now it is assumed that in the beginning equilibrium is established in the Wheatstone bridge and the coil 2 is traversed by no current, the coil remains in such a symmetrical position that the indicator stands in the middle of the scale and the current in the coil induced by the electro-magnet equals zero. This position is a position of stable equilibrium, for if the coil 2 is turned out of this position then the induced current which rises in the circuit formed by the coil 2 and the induction coil 4 strives to bring the coil 2 back into the zero position exactly as a spring would do. If it is now assumed that one of the resistances of the bridge, for example 9, changes, (consequently disturbing the equilibrium of the bridge) then the coil 2 receives current from the outside and is turned in one or the other direction according to the displacement of phase which the current in the coil has as regards the magnetic field. Since, however, the induced current increases in proportion to the deviation it gives rise to an increasing counter force which limits the deviation and brings the coil to rest in a position of equilibrium. This position is, moreover, independent of the potential, because action and reaction are approximately proportionate to the potential. For a given frequency, consequently, the deviation serves as a measure of the variation of the resistance 9 in the bridge.

The operation of the induction coil 4 is as follows:—Let the effective intensity of the magnetic alternating field be designated by H, the area of the movable coil by S and the angle through which this coil has been removed from a position for which the magnetic flux traversing the coil would be zero, by $\theta$. Furthermore, let the resistance be designated by R, the total self-induction of the circuit of the coil 2 by L, and the number of alternations of the current by $\omega$. Then the electro-motive force E induced by the magnetic field in the coil has the value $$E = \sin \theta . S . H . \omega$$

and the current strength is then $$I = \sin \theta \frac{S.H.\omega}{\sqrt{R^2 + \omega^2 L^2}}$$

This current traversing the movable coil produces a moment of rotation M, that replaces the directive force of springs and has the value $$M = S.H.I \cos \varphi$$

wherein the phase difference between the magnetic field and the current induced in the coil is designated by $\varphi$, and wherein this difference of phase is defined by the formula $$\cot \varphi = \frac{\omega L}{R}$$

If now I and $\cos \varphi$ are placed by their values then there is found for the moment of rotation M to which the coil is subjected the value $$M = \sin \theta . L . \frac{S^2 . H^2 . \omega^2}{R^2 + \omega^2 L^2}$$

We see that this moment of rotation which seeks to move the coil back into its zero position appears as soon as the electro-magnet is excited and without its being necessary to introduce into the movable coil any other current whatever from without. From the above equation it follows that the return rotation movement M depends upon the value of the self-induction L in the circuit of the movable coils and is only stable when L is present. If L was zero, the coil 2 would be in equilibrium in any position whatever, and if instead of the self-induction L there were present a condenser, then the condition of equilibrium in question would be changed to one of unstable equilibrium. By variation of the self-induction L, consequently the return rotation movement which takes the place of the directive force of the springs, can be controlled at will.

Figure 4:
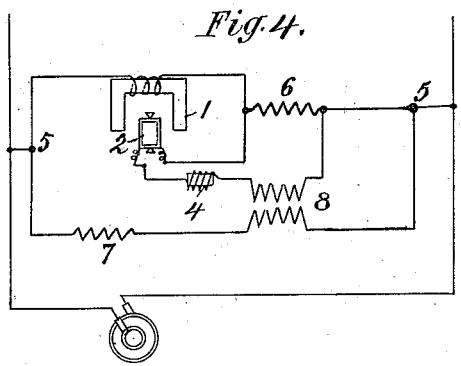

In Fig. 4 there is shown a diagram of an arrangement for the case in which the apparatus is to serve as a frequency meter. In this case, for influencing the direction of rotation of the coil through a change in the number of alternations, there are used two supplementing and opposing electro-motive forces. One of these electro-motive forces is obtained by a shunt connection with the low resistance 6, (which low resistance 6 is connected in series with the electro-magnet 1), while the second electro-motive force is obtained in the secondary winding of a transformer 8 with an open magnetic circuit, whose primary winding is connected in series with a high non-inductive resistance 7. It is easily seen that under these conditions the two electro-motive forces are displaced in phase by approximately 90° with reference to the potential of the system of wires and can be so connected that they are directed against each other. Moreover, one of the electro-motive forces decreases with the number of alternations; the other electro-motive force, on the other hand, increases. In this case, on the one hand, that electro-motive force which is derived from the low resistance 6 is in phase with the magnetic flux which is displaced by 90° as regards the potential of the system of wires because in the circuit containing the electro-magnet 1 and the resistance 6 the self-induction is the overpowering force. On the other hand, the electro-motive force in the secondary current of the transformer 8 is displaced by 90° as regards the primary current of this transformer. This current is, however, in phase with the current in the system of wires because the non-inductive resistance 7 which is connected in series with the primary coil is the overpowering factor. In the arrangement in question the binding posts of the net work of wires are designated by 5 and the movable coil by 2, and 4 designates a self-induction which serves for the purpose of controlling the counter force-couple and thereby the sensitiveness of the instrument. The electro-motive force at the terminals of the resistance 6 decreases if the magnetic flux, to which it is proportional, decreases, as soon as the frequency increases. In contradistinction thereto, the electro-motive force in the secondary coil of the transformer increases, because the primary current of this transformer, and its magnetic induction, attain a value practically constant, which value is controlled by means of resistance 7, while the secondary electro-motive force increases proportional to the frequency. If now it is assumed that under a definite number of alternations the two supplementing electro-motive forces mutually maintain equilibrium, then the coil 2 remains in its zero position and on account of the presence of the self-induction coil 4, which is connected in series with the secondary winding of the transformer 8, there is produced the force-couple bringing about stable equilibrium and this force-couple takes the place of the spring used in former devices. If the number of alternations increases, the electro-motive force which is derived from the low resistance 6 in the short circuit diminishes, but the electromotive force in the secondary winding of the transformer 8 increases, and the resulting current turns the coil in a definite direction. A decrease in the number of alternations would have brought about deviation in the reverse direction. However, the counter induction force-couple also increases here in proportion to the deviation and finally this force-couple brings the coil to rest in a position of equilibrium.

Figure 5:
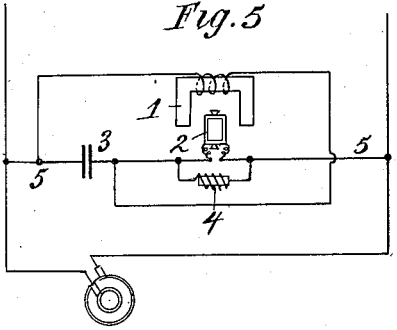

Fig. 5 shows by way of example an embodiment which is based upon the same principle. The condenser 3 is connected in parallel with the electro-magnet 1, and the resulting current moves the coil 2 with which a self-induction is connected in parallel and this controls the opposing force-couple. The condenser 3 plays a role which is equivalent to that of the transformer 8 of Fig. 2. It produces in the coil a current component which increases if the frequency increases, while the component arising from the magnetic flux diminishes if the frequency increases. According to the overbalancing of the one or the other of the two current components, which are relatively displaced in phase by 180°, the coil is deviated either to the right or to the left from the zero point.

Figure 6:
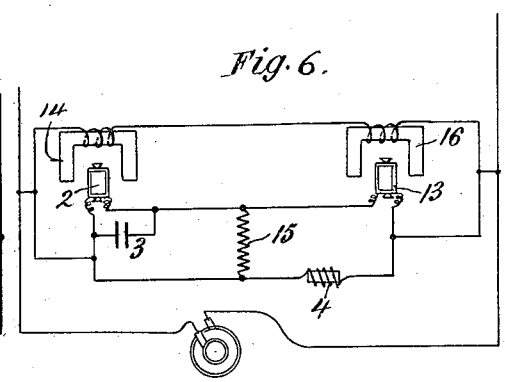

In Fig. 6 there is illustrated the connection of two similar devices which are fed by an alternating current under a constant frequency. It is in this manner possible to obtain a relay system which has the quality that on the displacing of one of the coils by an external force, for example by hand, the other coil is also deviated by the induction current created. In this device 14 and 16 designate the electro-magnets of the two apparatuses, 2 and 13 the movable coils, 3 a condenser, 15 a non-inductive resistance and 4 a self-induction. If the coil 2 is deviated from its position there arises therein an induction current which traverses the coil 13 and deviates this. In consequence of the deviation of the coil 13 there also arises therein an induction current which flows through 13, 4, 15, and in consequence of the presence of the self-induction 4, as was previously explained, produces a counter rotation moment so that the coil 13 assumes a definite position of equilibrium. It is still to be mentioned that the condenser 3 of Fig. 6 has for its object the offsetting of the self-induction of the current of the coil 2 and thus to suppress the directive force of the induction in this coil in such a manner that it can take place without the reaction of the external electro-motive force. The object of the self-induction coil 4 is to impart to the coil of the receiving apparatus a noticeable directive force and the resistance 15 allows of making to a noticeable extent the circuits of the two coils independent and to avoid reaction of the receiving coil upon the sending coil. The coil 2 is consequently entirely free, because its movement gives no occasion for the arising of any counter force pair, and because, moreover, the coil 13 in its deviation exercises no reaction upon the coil 2. On the other hand the coil 13 is moved along by the coil 2 if this is displaced by any external cause.

What is claimed is:—

An alternating current meter comprising an electro-magnet, an unrestrained movable coil in the field of said magnet connected to the same source of current as said magnet, and a self-induction in shunt with said movable coil, the self-induction in shunt with the coil producing an effect in said coil opposite to the deviating effect produced by said field on said coil, whereby the coil comes to rest in a position of stable equilibrium, without the intervention of mechanical force, in accordance with the electrical conditions of the circuit as regards resistances and reactances, but independent of the potential.

In witness whereof I have hereunto signed my name in the presence of two subscribing witnesses.

HENRI ABRAHAM.

Witnesses:
  LUCIEN MEMMINGER,
  GABRIEL BELLIARD.

Copies of this patent may be obtained for five cents each, by addressing the "Commissioner of Patents, Washington, D. C."